United States Patent
Thompson

[15] 3,675,742
[45] July 11, 1972

[54] DISC BRAKE CALIPER ASSEMBLY

[72] Inventor: Tom H. Thompson, 29210 Point-O-Woods Place, Southfield, Mich. 48078

[22] Filed: April 16, 1970

[21] Appl. No.: 29,116

[52] U.S. Cl. ............................188/72.5, 92/98 R, 92/164, 188/370
[51] Int. Cl. ......................................F16d 55/228
[58] Field of Search ...............188/72.1, 72.4, 72.5, 370; 92/61, 64, 98 R, 98 D, 101, 104, 169, 171, 164; 29/454, 522

[56] References Cited

UNITED STATES PATENTS

| | | | |
|---|---|---|---|
| 3,459,283 | 8/1969 | Newstead | 188/370 |
| 1,615,591 | 1/1927 | Mallory | 29/454 UX |
| 2,313,228 | 3/1943 | Domonkos | 29/522 UX |
| 2,467,629 | 4/1949 | O'Neill | 92/101 X |
| 3,163,274 | 12/1964 | Bowerman et al. | 92/98 X |
| 3,268,035 | 8/1966 | Wagner | 188/72.4 X |
| 3,476,221 | 11/1969 | Schanz | 92/169 X |

FOREIGN PATENTS OR APPLICATIONS

| | | | |
|---|---|---|---|
| 1,412,045 | 8/1965 | France | 188/370 |
| 1,196,309 | 5/1959 | France | 188/370 |
| 710,690 | 6/1954 | Great Britain | 188/370 |
| 717,350 | 10/1954 | Great Britain | 188/370 |
| 1,096,596 | 12/1967 | Great Britain | 188/72.4 |

Primary Examiner—George E. A. Halvosa
Attorney—McGlynn, Reising, Milton & Ethington

[57] ABSTRACT

A disc brake caliper assembly including a main body portion having a peripheral base portion and a pair of leg portions extending from the base portion which are spaced from each other to define a slot for receiving a rotatable brake disc. A bore or opening extends through at least one leg portion and a cap member is detachably mounted on the portions, the cap members each having a closure portion which is spaced from the slot and overlies one end of the bore. The cap member cooperates with the bore and the leg portion to define at least one chamber for receiving hydraulic brake actuators operable to extend a brake pad from the other end of the bore into the slot for braking engagement with a brake disc received in the slot.

13 Claims, 11 Drawing Figures

INVENTOR.
Tom H. Thompson
BY
Barnard, McGlynn & Reising
ATTORNEYS

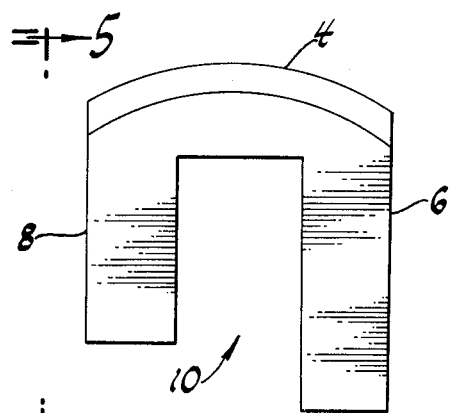
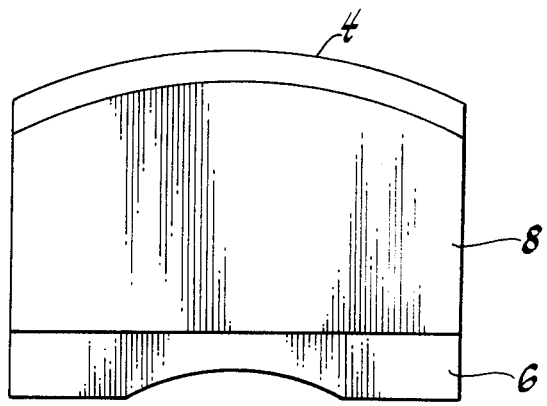
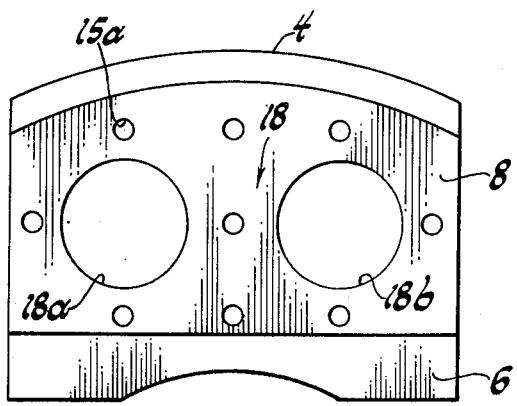
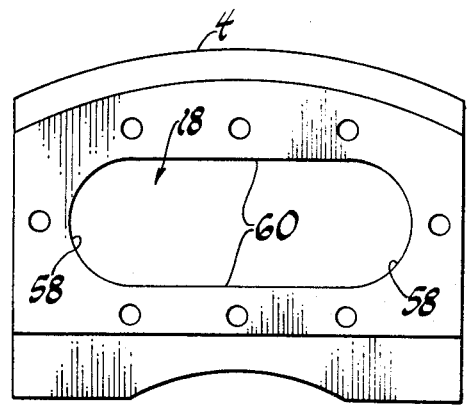
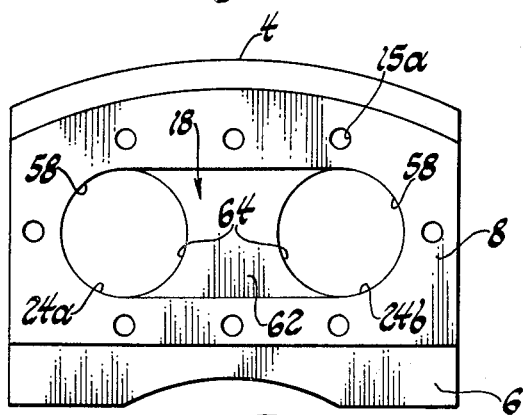
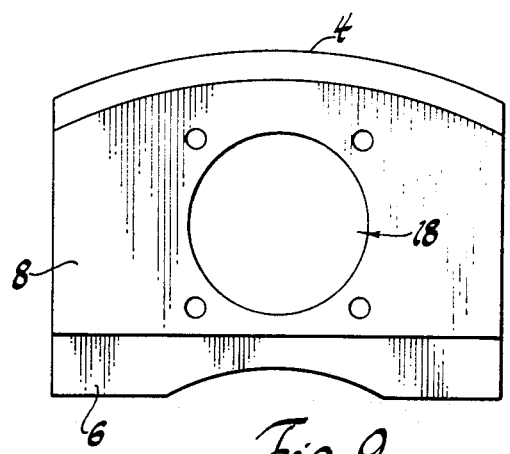
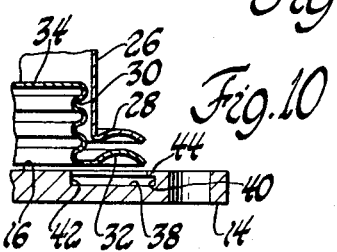
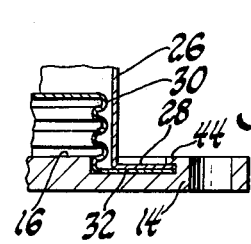

DISC BRAKE CALIPER ASSEMBLY

This invention relates generally to vehicle brake apparatus, and is particularly concerned with the construction of a disc brake caliper assembly for housing hydraulic actuators operable to apply braking pressure to opposite surfaces of a wheel-mounted brake disc.

In hydraulic disc brake systems for automobiles and similar vehicles, braking pressure is applied to opposite faces of a disc mounted to rotate with a wheel of the vehicle. The braking pressure must be applied by hydraulic actuators mounted on the opposite sides of the brake disc in a stationary position, the hydraulic actuators being mounted in a caliper secured to a stationary portion of the vehicle and provided with suitable hydraulic connections for transmitting hydraulic pressure to and from the actuators. The caliper is shaped and located such that a portion of the wheel mounted brake disc is received between the opposed actuators so that the actuators can apply braking pressure to the opposite faces of the rotating disc when caused to hydraulically extend from the caliper upon application of the brakes.

Application Ser. No. 692,218 filed Dec. 20, 1967, now abandoned, discloses a bellows-type brake actuator for use in a closed hydraulic brake system, the actuator having a corrugated sidewall which is inelastically deformable such that when the actuator is extended under pressure, the inelastic deformation of the corrugated sidewall prevents the actuator from rebounding to its original length when the hydraulic pressure is removed so that brake lining wear is compensated for by the progressive increase in the relaxed length of the actuator. Other types of brake systems are available wherein the brake pads are actuated into engagement with the brake disc by pistons slidably mounted in cylinders or chambers such that when the chamber is pressurized, the piston causes the brake pad to extend into engagement with the adjacent surface of the rotating brake disc to apply braking pressure.

An object of this invention is to provide a disc brake caliper assembly that can be used with several types and arrangements of actuators.

Another object is to provide a disc brake caliper assembly that can be used either with piston or bellows-type actuator, and can be converted for use with either a single, oblong or non-circular bellows-type actuator, or with a plurality of circular piston actuators.

Still another object is to provide a disc brake caliper construction having a bellows-type actuator mounted on a cap member of the caliper assembly so that the actuator is installed as a unit with the cap member to thereby reduce the possibility of improper installation and servicing of the brakes.

In carrying out the foregoing, and other objects, a disc brake caliper assembly according to the present invention comprises a main body including a peripheral base portion and a pair of leg portions extending from the base portion with a slot defined between the leg portions for receiving a wheel-mounted rotatable brake disc or rotor. At least one bore or opening extends through the leg portions, and a cap member is detachably mounted on the outer surfaces of the leg portions each of which includes a closure portion overlying the outer end of the bore.

One or a plurality of bores or openings of circular cross section may extend through the leg portions, or a non-circular bore or opening may extend through the leg portions. The cap member may include an insert for projecting into the non-circular bore to define a plurality of chambers for receiving individual actuators.

A sleeve member is mounted in the bore for each actuator to define the sidewalls of the chamber for the actuator, the sleeve member preferably having a low friction surface of Teflon or the like for engagement by the actuator sidewalls. A sleeve member and bellows-type actuator may have their flanges secured permanently to the cap member so that they can be installed as a unit into the main body.

Other objects, advantages and features of the invention will become apparent from the following description taken in connection with the accompanying drawings in which:

FIG. 4 is an end view of the main body of a caliper assembly according to the invention prior to machining of the bore for the actuator housing into the main body of the caliper;

FIG. 5 is a view taken on lines 5—5 of FIG. 4;

FIG. 6 is a view similar to FIG. 5 wherein a pair of cylindrical bores of circular cross sections are machined into the legs of the caliper main body;

FIG. 7 is a view similar to FIGS. 5 and 6 wherein a non-circular or oblong bore is formed in the legs of the caliper main body;

FIG. 8 is a view similar to FIG. 7 wherein a pair of cylindrical chambers of circular cross section are formed in the oblong bore of FIG. 7;

FIG. 9 illustrates a single cylindrical bore of circular cross section formed in the leg portions of the caliper main body; and FIGS. 10 and 11 illustrate in sequence the manner of attaching a bellows-type actuator and supporting sleeve to a cap member of the caliper assembly for installation as a unit into the caliper assembly.

Figure 1:
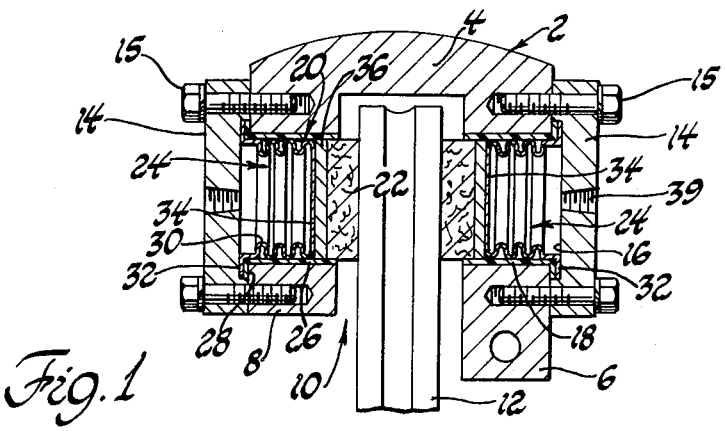
FIG. 1 is a sectional view of a caliper assembly according to the invention wherein bellows-type actuators are housed in the caliper.

FIG. 1 illustrates a disc brake caliper assembly comprising a main body 2 having a peripheral base portion 4 and a pair of leg portions 6 and 8 extending from the base portion. A slot 10 is defined between leg portions 6 and 8 for receiving a rotatable brake disc or rotor 12. A cap member 14 is detachably mounted on each of the leg portions by bolts 15, the cap member 14 having a closure portion 16 which is spaced from the slot 10 and which closes one end of a bore 18 extending through each of the leg portions. The bore extends from the closure portion 16 toward slot 10 with its other end communicating with slot 10. The cap member 14 cooperates with the bore 18 and the associated leg portion to define a chamber 24 for receiving brake actuator means 20 operable to extend a brake pad 22 from the other end of the bore into the slot 10 for braking engagement with the brake disc 12.

At least one chamber 24 is defined in each bore 18 for receiving a brake actuator assembly, and a sleeve 26 is received in each chamber 24, the sleeve 26 having a low friction surface defining the sidewall of the chamber 24. Sleeve 26 may be of stainless steel having a coating of Teflon or the like on its inner surface to provide a low friction surface for engagement by the actuators in a manner to be set forth below. Each sleeve 26 has a flange 28 formed on one end thereof which projects outwardly from the bore 18 and is held in position by the cap member 4.

An actuator 30 is received in each of the chambers 24 of FIG. 1 which is movable in response to pressure changes in chamber 24 for moving the brake pad 22 relative to the slot 10. Each actuator 30 in FIG. 1 includes an endless, corrugated sidewall having an outwardly extending flange 32 at one end thereof which is received between the flange 28 of sleeve 26 and the closure portion 16 of cap member 14, and a movable end wall 34 at the other end extending across the space enclosed by the corrugated sidewall. The movable end wall 34 is engaged with a brake shoe 36 on which the brake pad 22 is mounted.

In the illustrated embodiment of FIG. 1, actuators 30 are of beryllium-copper or some other ductile material with elastomeric material (omitted for clarity) interposed between the corrugated sidewall of actuator 30 and the low friction surface of sleeve 26. The actuators 30 extend upon pressurization of the respective chamber 24 through ports 39 to cause the brake pad 22 to apply braking pressure against disc 12.

In FIG. 1, the flanges 28 and 32 of sleeve 26 and actuator 30, respectively, are clamped between the opposed surfaces of leg portions 6 and 8 and the cap members 14. FIGS. 10 and 11 illustrate a method of mounting the actuator 30 and sleeve 26 onto the cap member 14 for installation as a unit onto the main body 4 of the caliper assembly. As shown in FIG. 10, a recess 38 is formed in the cap member which surrounds the periphery of the closure portion 16. The recess 38 has an outer peripheral edge 40 and an inner peripheral edge 42 with an inwardly extending lip 44 projecting from the upper end of the peripheral edge 40. In order to insert the flanges 32 and 28 into the recess 38 so as to be secured in position by the lip 44, flanges 28 and 32 are formed into a bowed configuration as shown in FIG. 10 to decrease their widths or radial expanse so that they can be inserted into the space between the lip 44 and inner edge 42. The bowed flanges 32 and 28 are then stamped into the straight configuration shown in FIG. 11 so that the lip 44 overlies the outer edges of the flanges 28 and 32 to prevent them from being removed from the groove 38.

Figure 2:
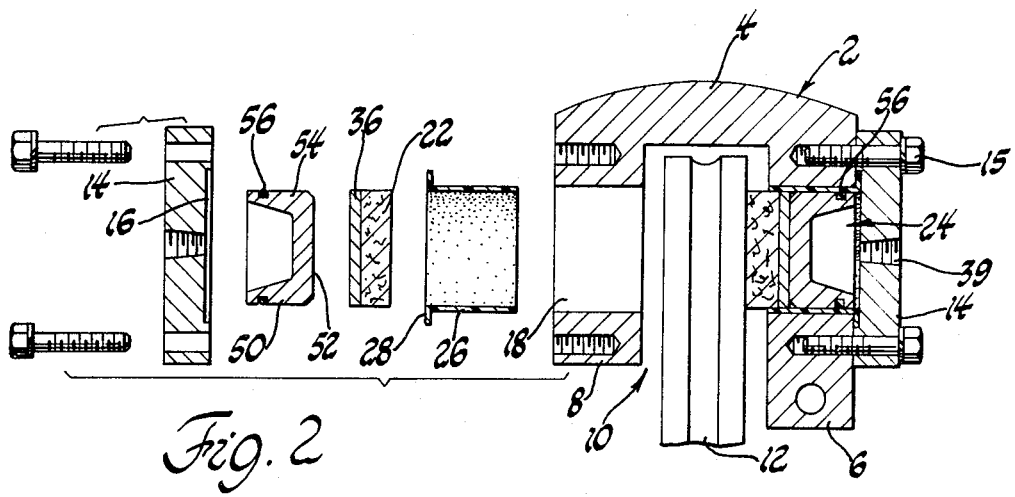
FIG. 2 is a partially exploded sectional view similar to FIG. 1 of a caliper assembly wherein piston-type actuators are mounted in the caliper.

In FIG. 2, the actuators are in the form of pistons 50 each having an end wall 52 and a peripheral sidewall 54 extending axially from the end wall 52. An O-ring 56 is mounted in a peripheral groove formed in the sidewall 54. Pressurization of chambers 24 through ports 39 causes pistons 50 to apply braking pressure to the brake disc 12 through brake pads 22.

As pointed out above, the chambers 24 are formed in bores 18 extending through the respective legs 6 and 8. The cap members 14 cooperate with the leg portions 6 and 8 and the bores 18 to define chambers for the actuator assemblies 20. The bores 18 in each of the leg portions 6 and 8 may take a variety of forms as illustrated in FIGS. 6 through 9.

FIGS. 4 and 5 are end and side views respectively of a blank for the caliper body 4 prior to the forming of the bores or openings 18 or of the tapped holes 15a for threadedly receiving the bolts 15. In FIG. 6, two cylindrical bores 18a and 18b of circular cross section are formed in the leg portions of the caliper, and each of the bores 18a and 18b defines a chamber 24. In FIG. 7, an oblong or oval shaped bore is formed in the leg portions and has semi-circular end portions 58 joined by straight side portions 60. In FIG. 8, the oblong opening 18 of FIG. 7 is converted into two cylindrical chambers 24a and 24b by a plug or insert portion 62 having oppositely curved semi-circular surfaces 64 which are complementary with the end surfaces 58 to form the sidewalls of chambers 24a and 24b. In FIG. 9, a single, circular bore 18 extends through the legs 6 and 8.

Figure 3:
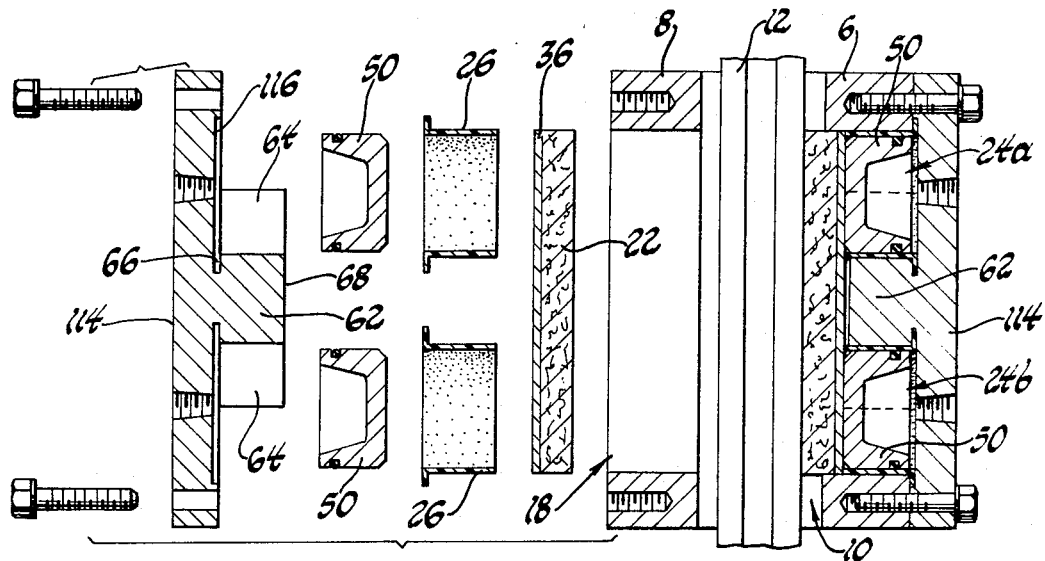
FIG. 3 is a sectional view of a caliper assembly according to the invention with the section taken at right angles to FIGS. 1 and 2 of still another arrangement wherein a plurality of piston actuators are housed within the caliper.

The bellows-type actuator 30 of FIG. 1 may be either circular to be received in the chambers of FIGS. 6, 8 and 9, or it may be non-circular and concentric with the oblong opening of FIG. 7. To convert the caliper body of FIG. 7 with the oblong opening or cavity 18 for use with circular pistons, a cap member 114 (FIG. 3) may be mounted on the leg portions 6 and 8 having an insert 62 formed thereon. Thus, in FIG. 3, a pair of chambers 24a and 24b are defined in the bore 18 for receiving brake actuators in the form of pistons 50. Sleeves 26 are received in each of the chambers 24a and 24b with the low friction surface of the sleeve defining the sidewall of the respective chambers 24a and 24b.

The insert 62 projects from the closure portion of the cap member 114 to define the pair of chambers 24a and 24b in the cavity 18. The semi-circular end portions of the cavity 18 cooperates with the oppositely curved semi-circular walls 64 of insert 62 to define the sidewalls for the chambers 24a and 24b. The chambers 24a and b are cylindrical with circular cross sections and are separated from each other by the insert 62.

Formed in the insert portion 62 at the junction of the insert with the closure portion 116 of the cap member is a groove 66 for receiving a portion of the flange of the sleeve 26 which is received in each of the chambers 24a and b. The remaining portion of the flange 28 of the sleeve 26 is received between the respective leg portions 6 or 8 and the respective cap member 114. The length of the insert portion 62 is such that the end face 68 opposite the cap member 114 is spaced inwardly from the slot 10. Consequently, when an actuator is received in each of the chambers 24a and b, a recess is defined by the bore 18 for receiving an oblong or oval brake shoe 36 with a correspondingly shaped brake pad 22 for engaging the brake disc 12. Thus, the brake shoe 36 of FIG. 3 has a shape concentric with the bore 18 and is engaged with each of the actuators and extends across the insert portion 62 between the chambers 24a and b. Consequently, upon pressurization of the chambers 24a and b, the brake pad 22 engages the brake disc 12 and applies braking pressure to the opposite surfaces thereof.

While specific examples of the invention are illustrated and described in the foregoing specification and accompanying drawings, it should be understood that the invention is not limited to the exact construction shown. Various alternatives in the construction and arrangement of parts, all falling within the scope and spirit of the invention, will become apparent to those skilled in the art.

The embodiments of the invention in which an exclusive property or privilege is claimed are defined as follows:

1. A disc brake assembly comprising: a plate member having an endless recess formed in one surface thereof; said recess having an inner peripheral edge and an outer peripheral edge which extends substantially perpendicularly with respect to said one surface of said plate member; an actuator having an endless side wall with a flange projecting outwardly from one end thereof, said flange being seated in said recess with said side wall projecting from said one surface of said plate member and the outer edge of said flange disposed adjacent said outer peripheral edge of said recess; a peripheral lip extending inwardly from said outer peripheral edge and overlying the outer edge of said flange to retain said flange in said recess; and a sleeve member having an endless side wall concentric with and surrounding the side wall of said actuator, said sleeve member having a flange projecting outwardly from one end of the side wall thereof, said flange of said sleeve member being seated in said recess and overlying the flange of said actuator with its outer edge projecting beneath said lip to be retained in said recess by said lip.

2. A disc brake caliper assembly comprising: a main body having a peripheral base portion and a leg portion extending from said base portion; a cap member detachably mounted on said leg portion and having a closure portion; at least one bore through said leg portion having one end closed by the closure portion of said cap member, said bore being of oblong shape with a pair of semi-circular end portions joined by parallel side portions and extending from said closure portion with the other end thereof communicating with the other surface of said leg portion; said cap member cooperating with said bore and said leg portion to define a pair of chambers for receiving brake actuator means operable to extend a brake pad from said other end of said bore for braking engagement with a brake disc; said cap member including an insert integral with said cap and projecting from said closure portion into said bore, said insert having semi-circular surfaces complementary with the semi-circular end portions of said bore to define a pair of cylindrical chambers of circular cross-section separated by said insert.

3. A disc brake caliper assembly as claimed in claim 2 wherein a groove is formed in said insert portion at the junction of said insert with said closure portion.

4. A disc brake caliper assembly as claimed in claim 3 further including a cylindrical sleeve received in each of said chambers, each sleeve having a low-friction surface defining the sidewall of its respective chamber.

5. A disc brake caliper assembly as claimed in claim 4 wherein each of said sleeves has a flange formed in one end thereof which projects radially outwardly from said one end of said bore with a portion of said flange received in said groove and a portion received between said leg portion and said cap member.

6. A disc brake caliper assembly as claimed in claim 5 wherein the length of said insert portion is such that the end of said insert portion opposite said cap member is spaced inwardly from the other surface of said leg portion.

7. A disc brake caliper assembly as claimed in claim 6 including an actuator received in each of said chambers, said actuators being movable in response to pressure changes in their respective chambers for moving a brake pad relative to said leg portion.

8. A disc brake caliper assembly as claimed in claim 7 further including a brake shoe having a shape concentric with said opening, said brake shoe being engaged with each of said actuators and extending across said insert portion between said chambers, and a brake pad on the opposite side of said shoe from said actuators extendable from said leg portion for engagement with a brake disc upon pressurization of said chambers.

9. A disc brake caliper assembly comprising: a main body having a peripheral base portion and a leg portion extending from said base portion; a cap member detachably mounted on said leg portion and having a closure portion; at least one bore through said leg portion having one end closed by the closure portion of said cap member, said bore extending from said closure portion with the other end thereof communicating with the other surface of said leg portion; said cap member cooperating with said bore and said leg portion to define at least one chamber; a sleeve received in said chamber, said sleeve having a low friction surface defining the sidewall of said chamber and a flange formed on one end thereof which projects outwardly from said one end of said bore and is held in position by said cap member; an actuator received in said chamber, said actuator being movable in response to pressure changes in said chamber for moving a brake pad relative to said bore; said actuator including an endless, corrugated sidewall having an outwardly extending flange at one end thereof received between the flange of said sleeve member and said cap member, and a movable end wall at the other end extending across the space enclosed by said corrugated sidewall; said cap member being formed with a recess surrounding the periphery of the closure portion of said cap member, the outwardly extending flanges of said sleeve and said actuator being received in said recess, and a lip extending from the outer edge of said recess and overlying the edges of said flanges and securing said flanges in said recess to prevent separation of said sleeve and actuator from said cap member such that said sleeve and actuator are withdrawn from said chamber upon detachment of said cap member.

10. A disc brake caliper assembly as claimed in claim 9 further including a brake shoe engaged with said movable end wall and a brake pad on said brake shoe extendable from said leg portion for braking engagement with a disc upon pressurization of said chamber.

11. A disc brake caliper assembly as claimed in claim 9 wherein said means securing said flanges in said recess comprises a peripheral lip on said cap member overlying the outer edges of said flanges to hold said flanges captive in said recess.

12. A disc brake caliper assembly as claimed in claim 9 wherein said bore comprises a non-circular opening extending through said one leg portion.

13. A disc brake caliper assembly as claimed in claim 12 wherein the sidewall of said chamber and the corrugated sidewall of said actuator are concentric with said non-circular opening.

* * * * *